(12) United States Patent
Snapir et al.

(10) Patent No.: US 8,116,265 B2
(45) Date of Patent: Feb. 14, 2012

(54) CHANNEL ESTIMATION

(75) Inventors: Dor Snapir, Moshav Segula (IL); Dubi Lever, Hashmonaim (IL)

(73) Assignee: Gilat Satellite Networks Ltd. (IL)

( * ) Notice: Subject to any disclaimer, the term of this patent is extended or adjusted under 35 U.S.C. 154(b) by 546 days.

(21) Appl. No.: 12/273,965

(22) Filed: Nov. 19, 2008

(65) Prior Publication Data

US 2009/0135789 A1  May 28, 2009

Related U.S. Application Data

(60) Provisional application No. 60/988,899, filed on Nov. 19, 2007.

(51) Int. Cl.
*H04W 4/00* (2009.01)
*H04J 3/00* (2006.01)
*H04B 7/185* (2006.01)

(52) U.S. Cl. ........ 370/328; 370/329; 370/330; 370/336; 455/12.1; 455/13.1; 455/13.4

(58) Field of Classification Search .......... 370/336, 370/328, 329, 330; 455/12.1, 13.1, 13.4
See application file for complete search history.

(56) References Cited

U.S. PATENT DOCUMENTS

| | | | |
|---|---|---|---|
| 2007/0096788 A1* | 5/2007 | Thesling | 327/284 |
| 2009/0161788 A1* | 6/2009 | Giraud et al. | 375/295 |
| 2011/0021137 A1* | 1/2011 | Laufer | 455/13.4 |

* cited by examiner

*Primary Examiner* — Chi Pham
*Assistant Examiner* — Farah Faroul
(74) *Attorney, Agent, or Firm* — Banner & Witcoff, Ltd.

(57) ABSTRACT

To allocate a very small aperture terminal (VSAT) to a modulation and coding pair (MODCOD) in a second generation digital video broadcasting satellite (DVB-S2) adaptive coding and modulation (ACM) system, a hub periodically transmits pilot frames of alternating MODCODs, which are identified by the VSAT. A field-programmable gate array (FPGA) at the VSAT site maintains telemetry of good and bad frames. A processor may then poll this telemetry to determine an optimal MODCOD to be allocated to the VSAT.

25 Claims, 4 Drawing Sheets

CHANNEL ESTIMATION

RELATED APPLICATION INFORMATION

This application claims priority to U.S. Provisional Patent Application No. 60/988,899, filed on Nov. 19, 2007, and entitled "CHANNEL ESTIMATION." Said provisional U.S. application is incorporated herein by reference in its entirety for all purposes.

FIELD OF THE INVENTION

The present invention relates generally to a second generation digital video broadcasting (DVB-S2) using adaptive coding and modulation (ACM), and more particularly it relates to an improved method and apparatus for allocation of very small aperture terminals (VSATs) to modulation and coding pairs (MODCODs).

BACKGROUND

DVB-S2 is a second generation standard for transmitting video and data over satellites. DVB-S2 is backward compatible with first generation standard, DVB-S, and has been optimized to perform better. The performance of the DVB-S2 is a result using the LDPC (low density parity check codes) and BCH (Bose-Chaudhuri-Hochquenghem) coding scheme combined with a variety of modulation formats such as, QPSK, 8PSK, 16APSK and 32APSK. In addition, for interactive applications such as Internet navigation, DVB-S2 employs ACM so as to mitigate fading caused by atmospheric effects. This mitigation is achieved by matching optimal MODCODs (modulation and coding pairs) to channel conditions of the VSATs, which implies that each VSAT would signal to the hub its perceived channel conditions based on the VSAT channel measurements such as the C/N (carrier-to-noise ratio) or the SNR (signal-to-noise ratio). In response to the received perceived channel conditions, the hub makes a frame-by-frame decision of the MODCOD to allocate to the VSAT for optimal performance. The modulation format supported by the ACM include QPSK, 8PSK, 16APSK and 32APSK and the supported coding rates include ¼, ¾, ⅓, ⅖, ⅔, ⅗, ⅘, ½, ⅚, ⅘, and 9/10. A benefit of ACM is that it allows for the reduction of system margins, which results in the efficient use of the system capacity and increase in data throughput.

BRIEF SUMMARY

As described above, to reduce system margin by allocating VSATs to MODCODs in a DVB-S2 ACM system, there is a need for each VSAT to estimate and send to the hub, its perceived channel condition based on measurements, such as the SNR. Using the received SNR, the hub allocates a MODCOD that is guaranteed to be received by the VSAT error free. However, a less accurate or slower tracking of the SNR by the VSAT results in a larger system margin, and the VSAT will be allocated to a MODCOD with less bits per symbol than the ideal allocation.

In accordance with one or more aspects of the invention, there is an alternative method and apparatus provided for allocating VSATs to MODCODs based on the reception of pilot frames.

In accordance with one or more aspects of the invention, a method of allocating VSATs to MODCODs is based on a periodic transmission of pilot frames of alternating MOD-CODs, which will be received and identified at the terminal (for example, VSAT).

In an aspect of the invention, the hub generates periodically, pilot packets per each of the MODCODs supported by the standard, on a separate PID (packet ID) when working with MPE (multi protocol encapsulation), or dedicated IP or label for GSE (generic stream encapsulation). The pilot packets of MODCODs are concatenated to BaseBand frames, which the hub transmits (as per the DVB-S2 standard) as pilot frames.

In another aspect of the invention, the hub transmits the same number of frames per each MODCOD per interval. In an exemplary embodiment, the hub transmits the pilot frames at an interval of around 1 second or less.

In the DVB-S2 ACM system of the invention, the IPE (IP encapsulator) has an IP input, performs encapsulation according to the MPE standard, breaks the IP into the MPEG, builds Base-Band frames and then sends them to a Modulator, with additional MODCOD labeling. The unit that sends the data to the IPE is in charge of maintaining the schedule of generating IP packets that will be transmitted in the pilot frames. These IP packets are referred to as pilot packets in this application.

In further aspects of the invention, a demodulator at the VSAT labels each packet, for example, MPEG/IP packet, with the MODCOD of the frame in which the packet is transmitted and indicates whether the frame is good or bad, based on, for example, a BCH decoder. In an exemplary embodiment, an FPGA (field-programmable gate array) maintains telemetry of the good and bad frames per MOD-COD based on the labels. A frame is determined to be good if it meets or exceeds set criteria and is bad if it is below the set criteria. The criteria can be user defined, or alternatively it can be defined by a computing device or processing device.

In still further aspects of the invention, a processor is provided that polls the telemetry at an interval that is smaller than half the interval between the pilot frames to determine the highest (least robust) MODCOD that can be received without errors. After two consecutive reads of identical value of the number of good frames and the number of bad frames (that is the MODCOD frame statistics) for the highest MODCOD received without errors, the processor determines this as the value for making MODCOD decisions.

The idea is that once a second the pilot frames are transmitted. The period of transmission of all the frames depends on the symbol rate. All the pilot frames are transmitted in a consecutive manner. The processor that polls the FPGA for the pilot frames statistics is not synchronized with the transmission. As a result the processor can poll the FPGA in the middle of a transmission cycle of pilots which might lead to the wrong conclusions as the number of frames received per MODCOD might differ by 1. If in two consecutive read cycles the frames statistics are identical we can assume that we have polled the status after the completion of a pilot frame cycle.

BRIEF DESCRIPTION OF THE DRAWINGS

A more complete understanding of the features described herein and the advantages thereof may be acquired by referring to the following description by way of example in view of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

As a result of the problems, discussed above, associated with allocating VSATs to MODCODs by tracking error measurement such as the SNR, it is desirable to have an alternative mechanism to allocate VSATs to MODCODs.

The present invention relates to improvements in methods and apparatus, which allocates VSATs to MODCODs in a DVB-S2 ACM system. Several MODCODs are active in a DVB-S2 ACM system. The number of MODCODs is primarily determined by the total system margin, which is derived from the fade margin, installation (pointing) loss and position within the beam primarily. In an exemplary embodiment, the operator of the system determines the spacing of the MODCODs. An advantage of having a large number of MODCODs is that it theoretically allows for smaller margins per VSAT, hence maximizing throughput.

Figure 1:
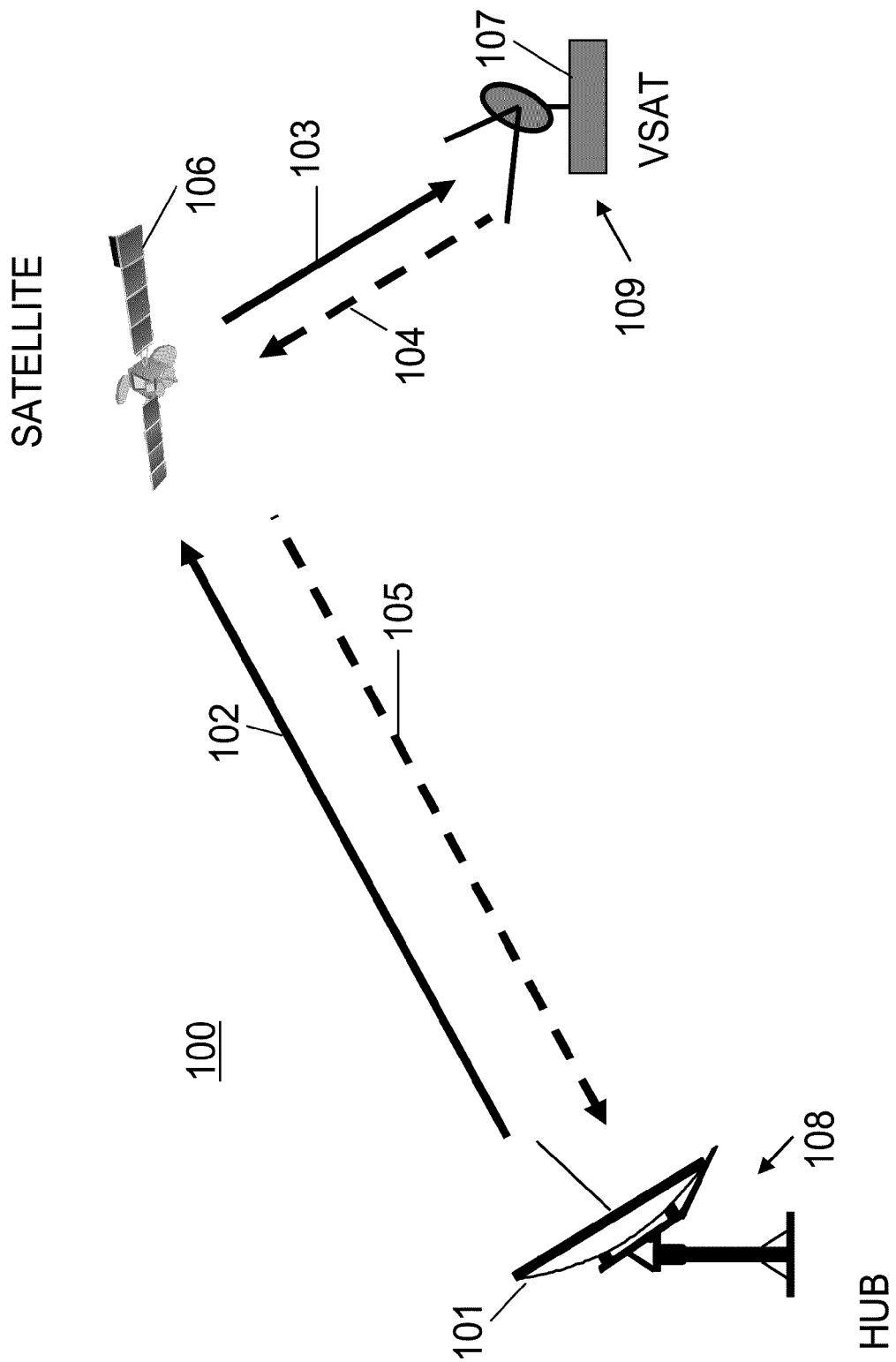
FIG. 1 shows an exemplary satellite employing a DVB-S2 ACM system in accordance with aspects of the invention.

FIG. 1, shows an exemplary embodiment of a DVB-S2 ACM system 100 including a hub site 108, a VSAT site 109, and a satellite 106. The system shows links 102 and 103, respectively, from hub 101 to VSAT 107 via satellite 105, and return links 104 and 105, respectively, from the VSAT 107 to the hub 101 via satellite 105.

In accordance with the present invention, the hub 101 periodically transmits pilot frames of alternating MODCODs, which will be received and identified at the VSAT 107. An FPGA maintains telemetry of good and bad frames, which is indicated by a demodulator. A processor polls the telemetry at an interval that is shorter than half the interval between two pilot frames transmissions. After two consecutive reads of identical MODCOD frame statistics (the number of good frames and number of bad frames), the processor screens the statistics and selects the highest (or least robust) MODCOD that does not have bad frames. The processor determines this as the value of the MODCOD for making MODCOD decisions. The VSAT 107 sends a signal to the hub 101, to indicate the MODCOD value. In response, the hub then allocates the VSAT to a MODCOD.

In addition to defining the modulation and encoding of the DVB-S2 ACM system, the DVB-S2 standard defines a threshold of SNR for Quasi Error Free (QEF) performance per MODCOD. The lower the modulation scheme (QPSK) and the more robust the code (that is the more bits for correcting errors), the better the performance. Hence, the terminal can achieve QEF performance at lower levels of SNR, lowering thresholds. High and Low MODCOD are terms that are not specified in the standard however they form a convenient "language" for dialogue. Therefore the most robust MOD-COD (which we will call lowest MODCOD) is QPSK ¼ and the SNR threshold is −2.3 dB whereas the least robust MOD-COD (which we will call the highest) is 32APSK 9/10 and the threshold is 16 dB. The order of MODCODs with respect to robustness between the lowest and highest MODCOD may be determined.

The advantages of having dedicated pilot frames for allocating MODCODs rather than using the useful data transmitted over the network are that: 1) minimal margin is enabled per VSAT as the spacing between active MODCODs at any given time can be large, and 2) maintenance of separate telemetry is enabled for useful data allocated to MODCODs based on VSAT conditions and telemetry of pilot frames.

Figure 2:
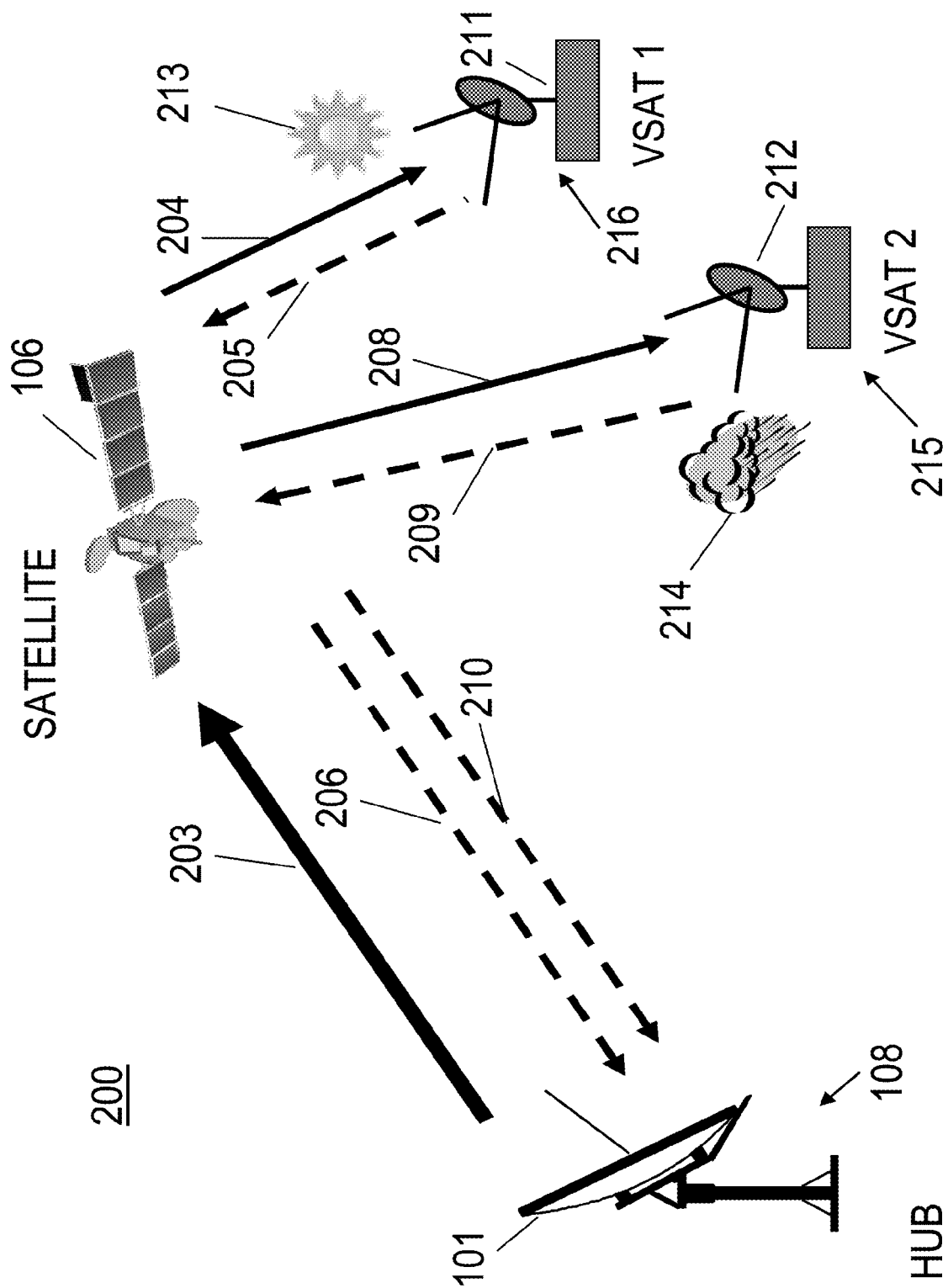
FIG. 2 shows an exemplary satellite employing a DVB-S2 ACM system to allocate each of two VSATs in different weather conditions to MODCODs.

Although one VSAT has been shown in the exemplary embodiment of FIG. 1, the DVB-S2 ACM system of the present invention may include a plurality of VSATs. For example, FIG. 2 shows a DVB-S2 ACM system 200 with VSAT1 211 and VSAT2 212. Because a plurality of VSATs may operate under different weather conditions, it is expected that they may be allocated to different MODCODs. For example, if per FIG. 2, VSAT1 211 operates with rainy channels and VSAT2 212 operates under clear sky conditions, VSAT1 211 and VSAT2 212 may be allocated to different MODCODs as a result of the different channels conditions. The different MODCOD allocation allows for efficient use of the system capacity, thus increasing throughput.

Figure 3:
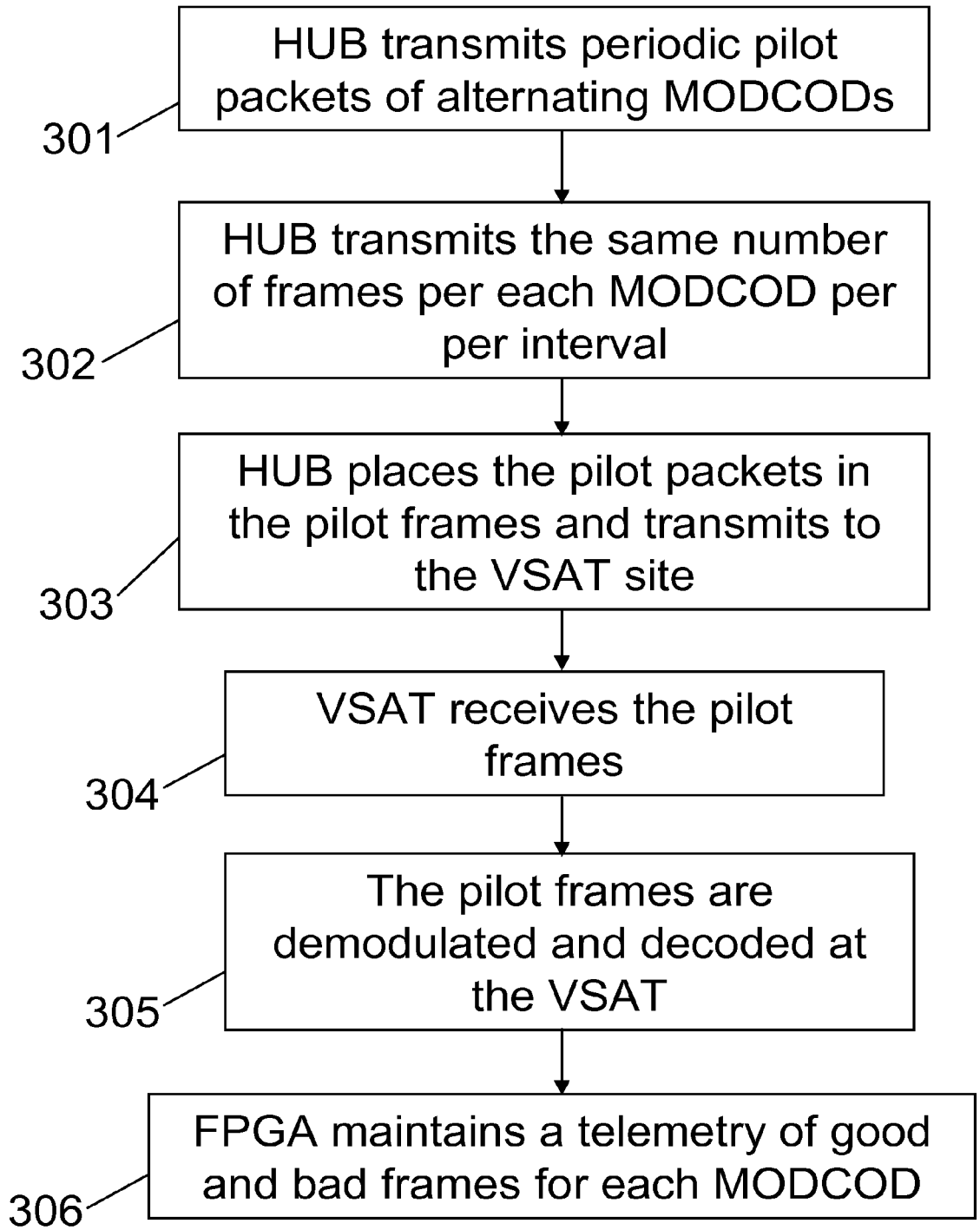
FIG. 3 shows a flowchart used to describe the steps of MODCOD reception at the VSAT in accordance with aspects of the present invention
Figure 4:
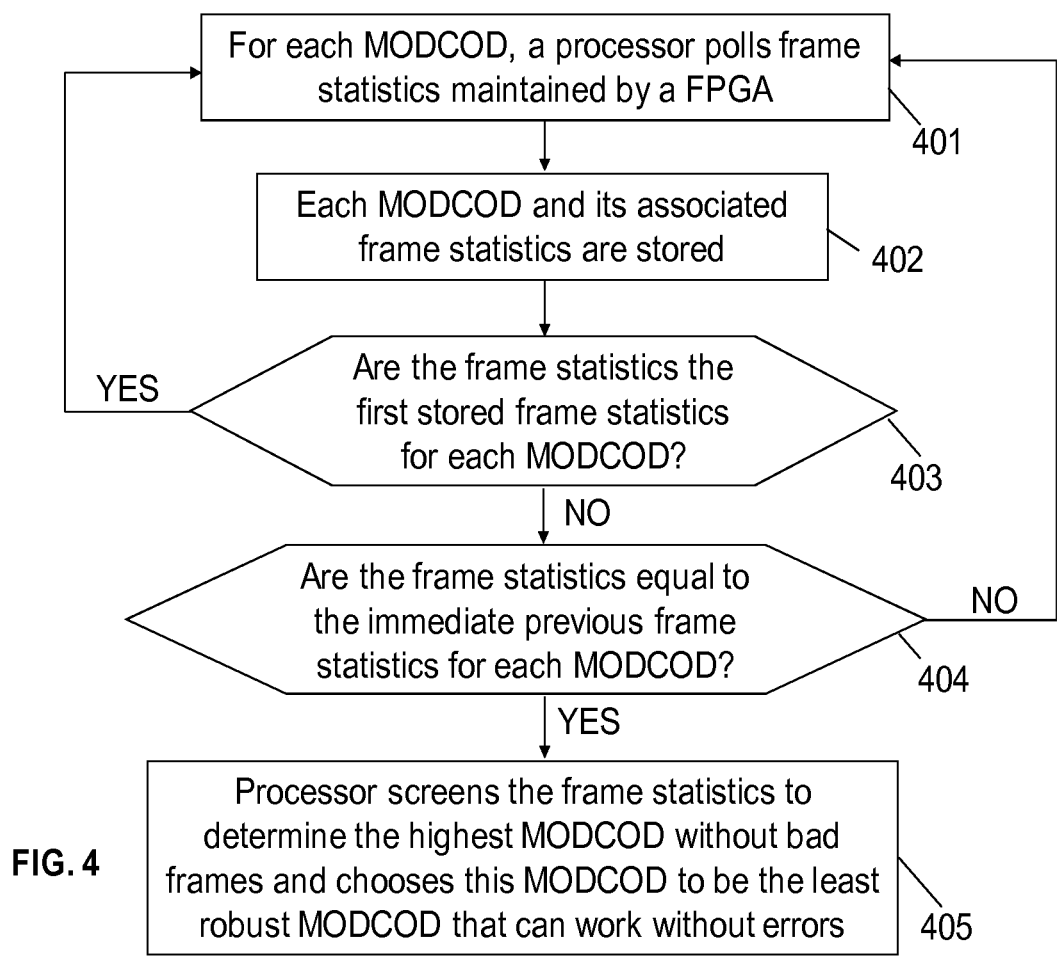
FIG. 4 shows a flowchart used to describe the steps leading to choosing a MODCOD value for making MODCOD decisions.

Referring to FIGS. 3 and 4, the method of transmitting, receiving and allocating a VSAT to a MODCOD will now be explained. In step 301 of FIG. 3, the hub 101 periodically transmits pilot packets of different MODCODs at an interval of around 1 second or less. The pilot packets may be transmitted on a separate PID when working MPE, or dedicated IP or label for GSE. In step 302, the hub 101 transmits the same number of pilot frames per each MODCOD per interval. In step 303, the pilot packets are placed in the pilot frames and transmitted to a VSAT site. The transmitted pilot frames may be short frames so as to reduce the overall overhead. The MODCODs selected for the pilot frames may be predefined MODCODs of the DVB-S2 ACM system or they can be a different set of MODCODs that are evenly spread apart by, for example, 1 dB between QEF (quasi error free) thresholds.

In step 304, the VSAT receives the pilot frames, where the pilot frames are demodulated and decoded according to step 305. A demodulator labels each packet, with the MODCOD of the frame in which it was transmitted, and indicates whether the frame is good or bad. In step 306, an FPGA maintains telemetry of the good and bad frames per MODCOD based on the labels on the packets.

Per each MODCOD in step 306 the FPGA will register the number of good frames and number of bad frames. The processor will poll these statistics (or the number of good frames and number of bad frames) at an interval that is shorter than half the interval between two pilot frames transmissions. Every time the processor polls these statistics it will have a different snap shot of the statistics. As an example, assume there are five MODCODs. One snap shot may show one good frame for each of the three highest MODCODs and zero good frames for the two lower MODCODs. The next time the statistics are polled, the snap shot may show that this is a good frame for all five MODCODs. The third time the statistics are polled once again, the snap shot may show that the statistics are identical for all MODCODs. This means that we have two consecutive reads for all MODCODs, which are identical, hence valid.

Now the processor needs to screen the statistics and find the (least robust) highest MODCOD that does not have any bad frames. This MODCOD is determined as the least robust MODCOD that can work without errors. For convenience, the statistics can be reset so that the processor will be able to check each time whether the single pilot frame was good or bad.

Turning to FIG. 4, in order to allocate the VSAT to a MODCOD, in step 401a processor polls the telemetry maintained by the FPGA at an interval that is smaller than half the interval between the pilot frames. In step 402, the MODCOD frame statistics are stored for each MODCOD. The determined MODCOD associated with the MODCOD frame statistics may also be stored in step 402. In step 403, the processor determines whether the stored MODCOD statistics are the first stored MODCOD statistics for each MODCOD. If so, the process returns to step 401 to poll again, since there needs to be at least two stored MODCOD statistics from consecutive polling cycles for comparison. If there has been a stored MODCOD statistics, the process proceeds to step 404. In step 404, the stored MODCOD frame statistics are compared with the MODCOD frame statistics of the immediate previously stored MODCOD frame statistics. If the frame statistics are identical, in step 405, the processor screens the statistics and selects the highest (least robust) MODCOD that does not have bad frames. This selected MODCOD is determined to be the least robust MODCOD that can work without errors. Optionally, the statistics can be reset so that the processor will be able to check each time whether a single pilot frame is good or bad.

At this point, the VSAT performs one of the following exemplary steps: 1) the determined ideal MODCOD (highest MODCOD without errors) value for making MODCOD decision is transmitted in the SAC (satellite access control) field; 2) the VSAT uses a lookup table to determine and transmit the Es/No corresponding to the highest MODCOD value for making MODCOD decision, wherein Es/No is the energy per bit per noise power spectral density; 3) the VSAT transmits the second best MODCOD and provides a margin for the system.

Regarding transmitting the second best MODCOD in the exemplary step 3), if the VSAT transmits the highest MODCOD there is a possibility that straight after transmission a fade condition begins at 1 dB per second. By the time the hub processes the message and reallocates the VSAT to the higher MODCOD and sends a message back to the VSAT, it might have SNR that is not sufficient for receiving the packet. The second best MODCOD gives a margin that compensates for fast fading.

The present invention has been described in terms of preferred and exemplary embodiments thereof. Numerous other embodiments, modifications and variations within the scope and spirit of the appended claims will occur to persons of ordinary skill in the art from a review of this disclosure.

We claim:

1. A method of allocating a terminal to a MODCOD (modulation and coding pair) comprising:
    (a) performing a first polling of a telemetry of good and bad pilot frames of alternating MODCODs;
    (b) storing a first MODCOD frame statistics based on the first polling;
    (c) performing a second polling of the telemetry of good and bad pilot frames of alternating MODCODs;
    (d) storing a second MODCOD frame statistics based on the second polling;
    (e) comparing the first and second stored MODCOD frame statistics to determine whether the compared statistics are identical;
    (f) if the first and second stored MODCOD frame statistics are not identical, repeating steps (a)-(e) until a stored first and second MODCOD frame statistics are identical;
    (g) screening the MODCOD frame statistics to determine a least robust MODCOD without bad frames when first and second stored MODCOD frame statistics are identical; and
    (h) choosing the determined least robust MODCOD in (g) for making MODCOD decisions.

2. The method of claim 1, wherein the determined MODCOD in step (g) is the least robust MODCOD that can work without errors.

3. The method of claim 1, wherein the telemetry of good and bad pilot frames is based on pilot frames of alternating MODCODs that are transmitted from a hub.

4. The method of claim 1, wherein the terminal is a VSAT (very small aperture terminal).

5. The method of claim 1, further comprising maintaining the telemetry of good and bad pilot frames of alternating MODCODs by a FPGA (field-programmable gate array).

6. The method of claim 1, further comprising transmitting, in a satellite access control (SAC) field, the least robust MODCOD received without errors.

7. The method of claim 1, further comprising transmitting a Es/No (energy per bit per noise power spectral density) corresponding to the least robust MODCOD received without errors, based on a lookup table of the terminal.

8. The method of claim 1, further comprising transmitting a second best MODCOD, and providing a margin for the terminal.

9. The method of claim 1, wherein the pilot frames are transmitted using a separate packet identifier (PID) when working with multi-protocol encapsulation (MPE), or using dedicated Internet Protocol (IP) address or label for generic stream encapsulation (GSE).

10. The method of claim 1, wherein the MODCODs selected for the pilot frames are predefined.

11. The method of claim 1, wherein the MODCODs selected for the pilot frames form a set of MODCODs that are evenly spread apart between quasi error free (QEF) thresholds.

12. The method of claim 11, wherein 1 dB spreading is applied between the QEF thresholds.

13. The method of claim 1, further comprising transmitting a signal to a hub indicating a chosen MODCOD.

14. The method of claim 13, wherein the hub includes an Internet Protocol (IP) encapsulator and modulator.

15. The method claim 1, wherein the pilot frames include pilot packets in accordance with a motion picture experts group (MPEG) standard.

16. The method of claim 1, wherein the pilot frames include Internet Protocol (IP) pilot packets.

17. The method of claim 1, wherein each of the pilot frames include one or more pilot packets labeled with the MODCOD of the pilot frame in which it was transmitted.

18. The method of claim 17, wherein the telemetry of the good and bad MODCOD frames is maintained based on the labels of the pilot packets.

19. A system for allocating a terminal to modulation and coding pairs (MODCODs) comprising:
    a device configured to periodically transmit pilot frames of alternating MODCODs;
    a device configured to calculate errors associated with receiving each of the MODCODs;
    a device configured to maintain telemetry of good and bad frames;
    a processor, the processor configured to:
    (a) poll the telemetry of good and bad pilot frames;
    (b) store a first MODCOD frame statistics;
    (c) poll the telemetry of good and bad pilot frames;

(d) store a second MODCOD frame statistics;
(e) compare the first and second stored MODCOD frame statistics to determine whether the compared statistics are identical;
(f) upon determining that first and second stored MODCOD frame statistics are not identical, repeat steps (a)-(e) until a stored first and second MODCOD frame statistics are identical;
(g) screen the MODCOD frame statistics to determine the least robust MODCOD without bad frames when the stored first and second MODCOD frame statistics are identical; and
(h) choose the determined least robust MODCOD in (g) for making MODCOD decisions.

20. A system for allocating a terminal to modulation and coding pairs (MODCODs), the system comprising:
a processor;
a transceiver;
memory storing computer readable instructions that, when executed, cause the processor to perform a method comprising:
(a) polling the telemetry of good and bad pilot frames;
(b) storing a first MODCOD frame statistics;
(c) polling the telemetry of good and bad pilot frames;
(d) storing a second MODCOD frame statistics;
(e) comparing the first and second stored MODCOD frame statistics to determine whether the compared statistics are identical;
(f) upon determining that first and second stored MODCOD frame statistics are not identical, repeating steps (a)-(e) until a stored first and second MODCOD frame statistics are identical;
(g) screening the MODCOD frame statistics to determine the least robust MODCOD without errors when the stored first and second MODCOD frame statistics are identical; and
(h) choosing the determined least robust MODCOD in (g) for making MODCOD decisions.

21. The system of claim 20, wherein the terminal is a very small aperture terminal (VSAT).

22. The system of claim 20, the method further comprising transmitting, in a satellite access control (SAC) field, the least robust MODCOD received without errors.

23. The system of claim 20, the method further comprising transmitting Es/No corresponding to the least MODCOD received without errors, based on a lookup table of the terminal.

24. The system of claim 20, the method further comprising transmitting a second best MODCOD, and providing a margin for the terminal.

25. A system for allocating a terminal to modulation and coding pairs (MODCODs) comprising:
(a) means for periodically transmitting pilot packets of alternating MODCODs;
(b) means for periodically transmitting a same number of frames per MODCOD per interval, wherein the pilot packets are placed in the frames and transmitted as pilot frames of the alternating MODCODs;
(c) means for receiving the pilot frames of the alternating MODCODs; and
(d) for each of the pilot frames, means for indicating whether a pilot frame is good or bad, based on a determined threshold,
(e) means for maintaining a telemetry of good and bad pilot frames per alternating MODCOD cycle.
(f) means for polling the telemetry of good and bad pilot frames;
(g) means for storing a first MODCOD frame statistics;
(h) means for polling the telemetry of good and bad pilot frames;
(i) means for storing a second MODCOD frame statistics;
(j) means for comparing the first and second stored MODCOD frame statistics to determine whether the compared statistics are identical;
(k) means for upon determining that first and second stored MODCOD frame statistics are not identical, repeating steps (f)-(k) until a stored first and second MODCOD frame statistics are identical; and
(l) means for screening the MODCOD frame statistics to determine the least robust MODCOD without bad frames;
(m) means for choosing the determined least robust MODCOD in (l) for making MODCOD decisions.

* * * * *